July 9, 1946.  H. F. PITCAIRN  2,403,456
AIRCRAFT HOLD-DOWN DEVICE
Filed July 17, 1941  4 Sheets-Sheet 2

INVENTOR:
Harold F. Pitcairn
BY
Synnestvedt & Lechner
ATTORNEYS.

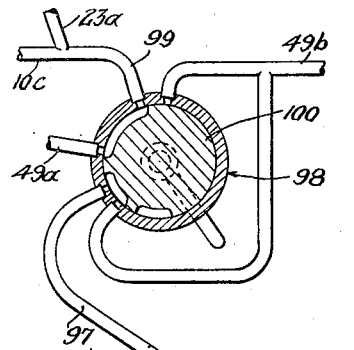
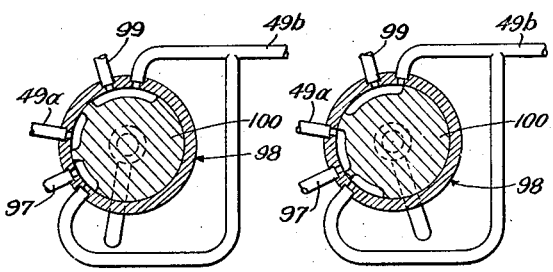
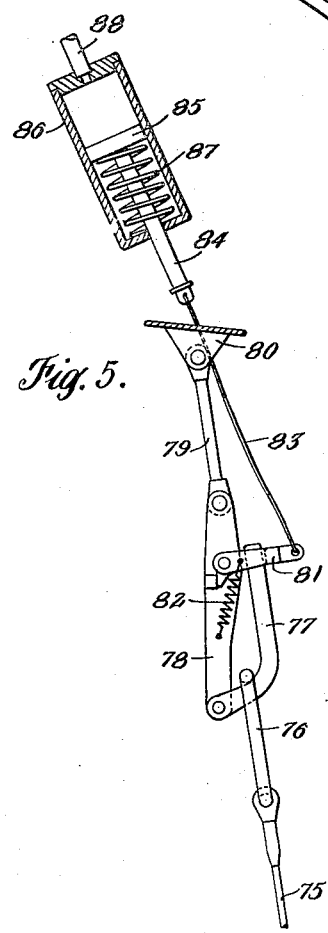
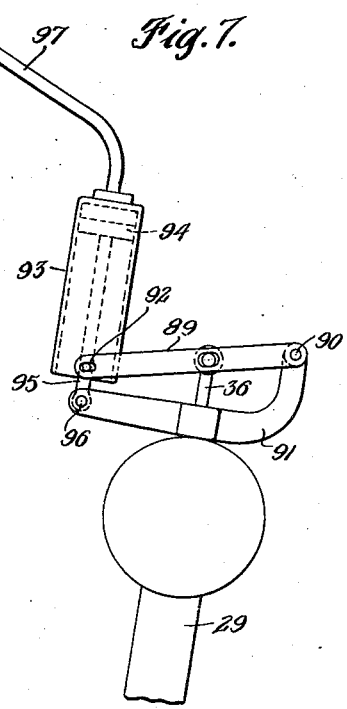

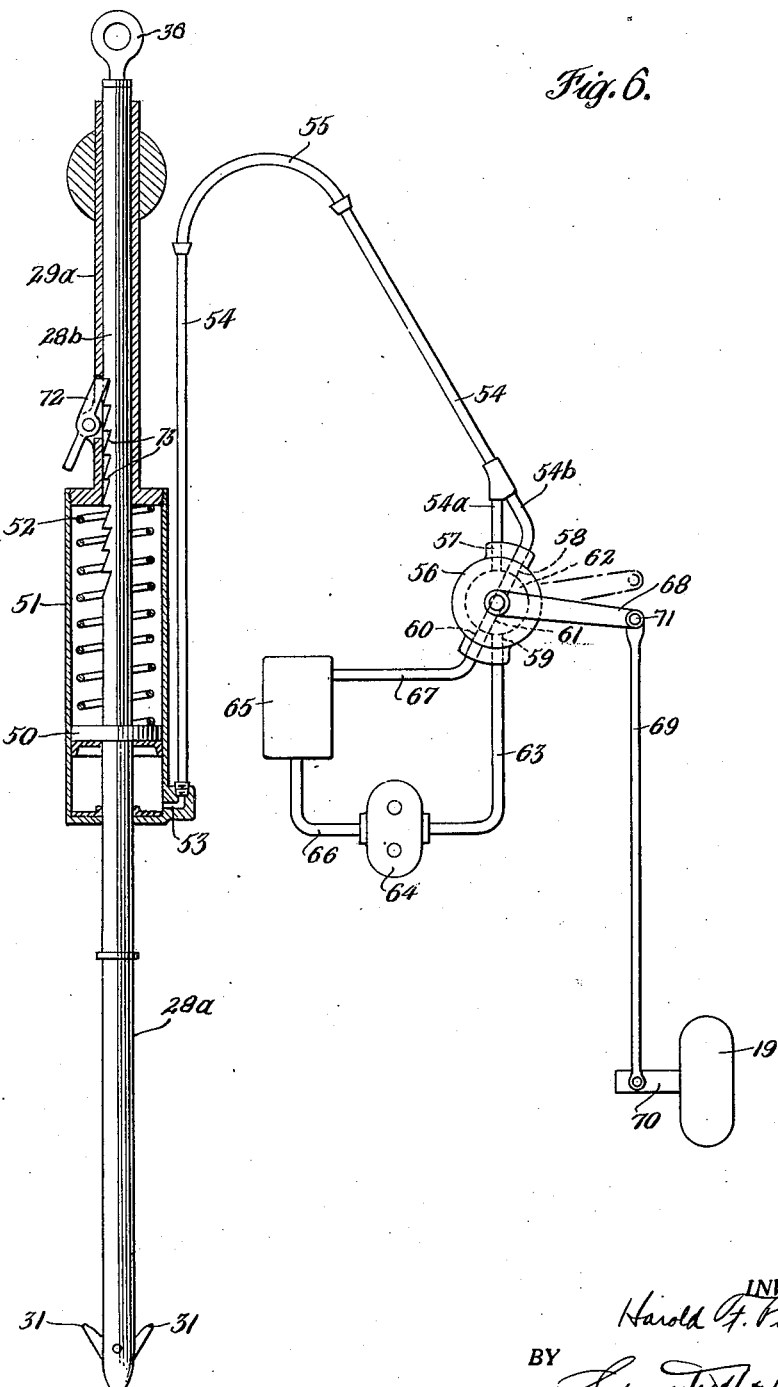

Patented July 9, 1946

2,403,456

UNITED STATES PATENT OFFICE 2,403,456

AIRCRAFT HOLD-DOWN DEVICE

Harold F. Pitcairn, Bryn Athyn, Pa., assignor to Autogiro Company of America, Philadelphia, Pa., a corporation of Delaware Application July 17, 1941, Serial No. 402,769

14 Claims. (Cl. 244—110)

This invention relates to an aircraft hold-down device, and is particularly adapted to aircraft such as those equipped with one or more sustaining rotors, which craft are capable of substantially vertical, or at least very steep, descent to a landing. Features of the invention are further of use where the aircraft is also adapted for vertical take-off.

Although the invention is not limited thereto, it is of especial importance and use for ship deck landings and take-offs, where these operations and especially landing are complicated not only by the restricted space available for the landing platform, but also by the fact that the landing platform partakes of the pitching, rolling and heaving motions of the ship.

In accordance with one of its broader aspects, the invention contemplates the provision of cooperating devices or elements on the aircraft and on the landing platform adapted to interengage to hold the aircraft tightly to the landing platform after a landing has been made, the said devices or elements being so arranged as to be effective in any one of a multiplicity of positions in which the aircraft may alight on the platform.

Preferably, the foregoing is accomplished by the employment of a grillwork landing platform and by equipping the aircraft with a downwardly projecting strut, the lower end of which is adapted to enter any one of a multiplicity of apertures in the grillwork, the strut being provided with means adapted to engage a grillwork element after a landing has been made in order to hold the aircraft to the platform.

Another object of the invention resides in the mounting of the strut in the aircraft in such manner that it has freedom for movement to compensate for forward and sideward shifting of position of the aircraft on the platform during the landing operation.

The means carried by the strut for interlocking with the landing platform desirably take the form of retractable barbs or latches, and provision is made for the pilot to retract said barbs at a time when take-off is desired. The invention further provides means for automatically retracting the barbs when certain controls are actuated to effect direct take-off, as will further appear.

The invention also contemplates the employment of pilot operated means for projecting and retracting the hold-down strut so that, when in normal flight, the strut may be withdrawn within the fuselage fairing, said means being also operative to adjust the angle of the strut to substantially parallel the normal landing flight path.

In accordance with another aspect of the invention, the hold-down strut is of multi-part construction providing for extension and contraction thereof. Automatic means are also contemplated for contracting the strut immediately upon making a landing, so that the aircraft is drawn down tightly to the landing platform.

Still another feature is the provision of hold-down means independent of the hold-down strut mentioned, such additional means being adapted to hold the aircraft to the platform when driving the rotor in preparation for take-off. A mechanism is further provided for automatic release of the hold-down means when the aircraft controls are actuated to effect take-off.

How the foregoing and other objects and advantages are attained will be apparent from the following description, referring to the accompanying drawings, in which—

Figure 5 is an enlarged view of certain parts (appearing on a smaller scale in Figure 1) of a hold-down means adapted for use when preparing for take-off;

Figure 6 is a diagrammatic view of a modification of the hold-down strut for landing, incorporating automatic means for contracting the strut upon making a landing;

Figure 7 is a schematic view of another modification, incorporating means automatically inter-relating release of the barbs (on the hold-down strut) with operation of the aircraft controls for take-off; and Figures 8 and 9 are sectional views through the control valve of Figure 7, showing that valve in different positions.

Figure 1:
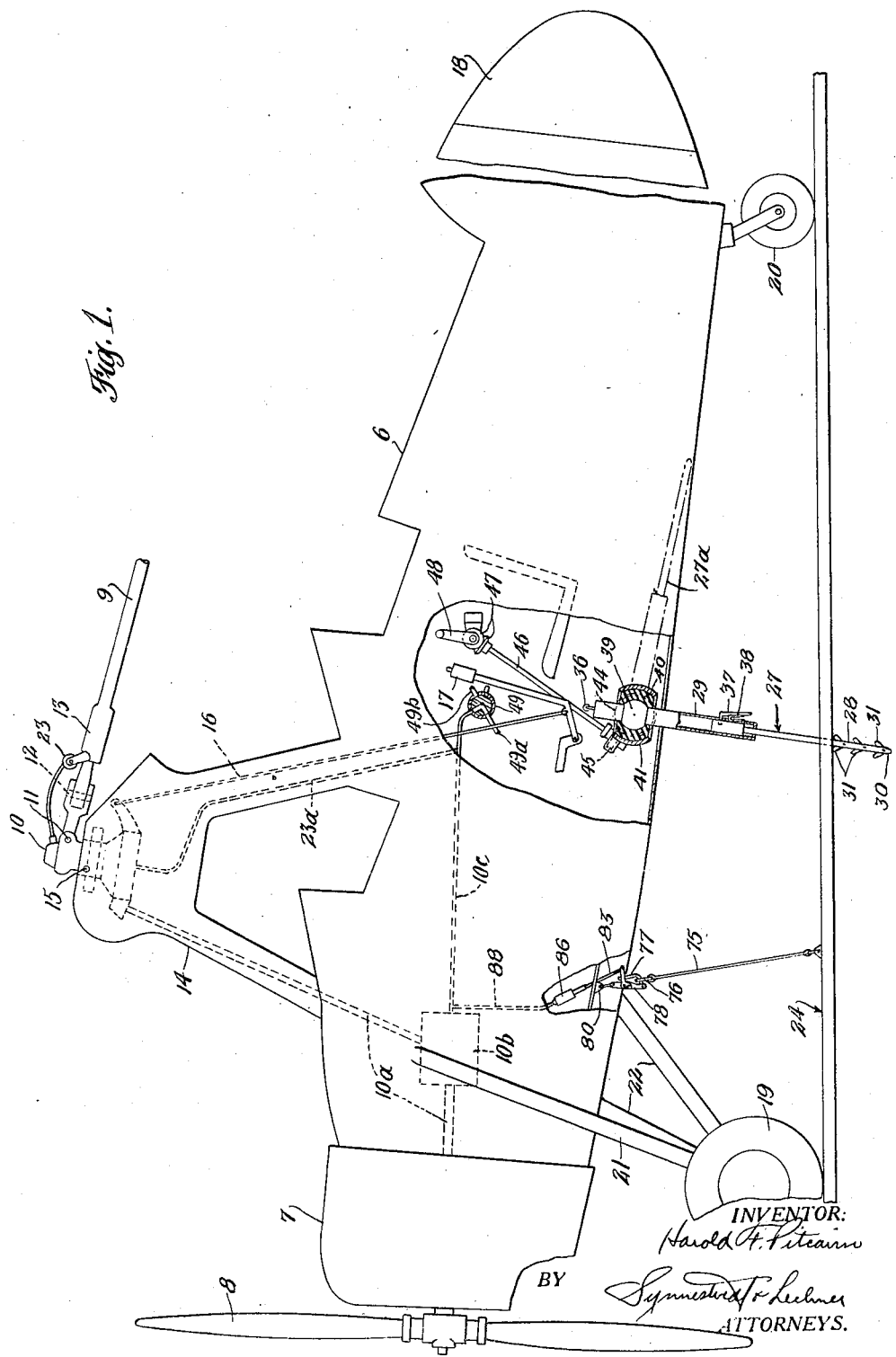
Figure 1 is a side outline view of an aircraft of the rotative wing type equipped with the mechanism of the present invention, the aircraft here being shown on the landing platform with the hold-down strut in operative position.

Referring to the drawings, the invention is here shown as applied to an aircraft comprising a body 6 having an engine at the nose, enclosed in cowling 7, the engine driving the propulsive airscrew 8, and further having a single sustaining rotor consisting of blades 9 pivoted to a rotative hub 10 by means of "flapping," "drag" and "pitch" pivots 11, 12 and 13. The sustaining rotor is mounted on the body by means of a pylon structure 14, a non-rotative part of the hub being pivotally connected with the pylon to provide freedom for tilting movement in all directions for purposes of control. One such tilting pivot appears at 15, and a connection for control of tilting is shown at 16 as extending downwardly to the control stick 17. The control system need not be considered in detail herein since it forms no part of the present invention per se, but such control system is of importance in an aircraft capable of substantially vertical descent and/or take-off, as is herein contemplated. A control system of the general type here involved is fully disclosed and claimed in copending application of Juan de la Cierva, Serial No. 645,985, filed December 6, 1932, which application issued July 31, 1945, as Patent No. 2,380,580.

The controls for the aircraft may also include a controllable rudder 18.

The landing gear includes a pair of forward wheels, one shown at 19, and a tail wheel 20, the wheels 19 being connected with the body by compressible shock struts 21 and diagonal struts 22.

Another feature of the general structure of the aircraft is the provision of means for effecting generally vertical take-off. It is thus contemplated that the aircraft is of a type which may operate both to and from a small area landing platform, such as may readily be mounted on almost any ocean going vessel.

Although with the particular aircraft illustrated the sustaining rotor is aerodynamically or autorotationally actuated during normal flight, the invention is also applicable where the rotor is power driven during normal flight. Where the rotor is normally aerodynamically actuated, provision may be made for substantially vertical take-off by driving the rotor from the forward propulsion engine with the rotor blades at zero or low pitch, whereby to store kinetic energy in the rotor which is subsequently released by raising the blade pitch to a substantial positive value, the rotor drive mechanism then being disconnected, for which purpose a manually operable clutch is used. The details of such "jump" take-off mechanism need not be considered herein, although in Figure 1 there is shown rotor drive shafting at 10a and a gear and clutch unit at 10b. There is also illustrated in Figure 1 a pitch change mounting 13 for each rotor blade 9 (only one being shown), the control of pitch being secured through a hydraulic system including piston and cylinder device 23 (which may be of the type disclosed in the Ray patent mentioned below), adapted to be supplied with fluid under pressure (to reduce the blade pitch) through piping 23a, later referred to. It may be mentioned that the rotor drive desirably incorporates an overrunning clutch (not shown) to ensure free autorotation in normal flight.

For further particulars relating to jump take-off mechanisms, reference may be made to Patent 2,216,163, issued October 1, 1940, of James G. Ray, or to copending application of Juan de la Cierva, Serial No. 738,349, filed August 3, 1934, which application issued July 31, 1945, as Patent No. 2,380,583.

As hereinabove mentioned, the landing platform comprises a grillwork or grating 24. This grillwork may take a variety of specific forms, the important requirements being the provision of a multiplicity of grillwork openings widely distributed over the area of the platform, and spacing of the grillwork elements sufficiently close to provide adequate support for the aircraft when its landing wheels 19 and 20 rest on the platform.

Figure 2:
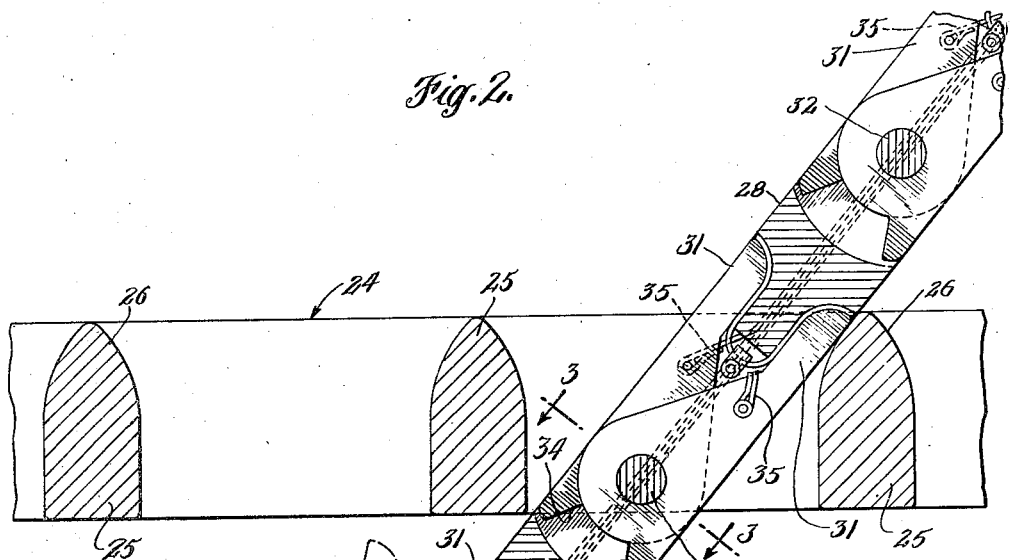
Figure 2 is an enlarged vertical sectional view of a portion of the landing platform and of the lower end of the hold-down strut, the latter being shown at a different angle, to illustrate the variability of operative angles.

As shown in Figure 2, the grillwork platform consists of a "criss-cross" of interconnected elements 25, although any other appropriate pattern or disposition of the elements may be used. Each of the elements 25 desirably is tapered toward its upper edge, as indicated at 26, so as to cooperate with the hold-down strut in guiding the latter into an aperture in the grillwork regardless of the position in which the strut approaches the platform when making a landing.

The hold-down strut is indicated generally in Figure 1 at 27, the same being shown in this view in full lines in extended position and in dot and dash lines (at 27a) in retracted position. The strut consists of a lower part 28 the upper end of which is adjustably telescoped with an upper part 29, which latter is mounted in the aircraft as will further appear. At its lower extremity, the part 28 is rounded or tapered off to a substantial point, as indicated at 30, so as to cooperate with the beveled edges 26 of the grillwork elements 25 in ensuring entrance of the strut into an aperture of the grillwork regardless of the position in which a landing is being made on the platform.

Toward its lower end the part 28 of the strut is provided with at least one, and preferably several, vertically spaced pairs of releasable barbs or latches 31. As seen in Figure 2, each pair of latches 31 is mounted on a common pivot pin 32, the strut member 28 being appropriately recessed so that when the latches are retracted they lie substantially within the overall dimensions of the strut. This position of the latches 31 on pivot 32 is shown in full lines in Figure 2. In dotted lines, at 31a, a pair of latches is shown in extended position. At least the initial movement to the extended position is effected under the influence of a leaf spring 33, the two ends of which bear respectively against the two latches of a pair, the spring being deflected to U-shape when the latches are retracted into the strut, as clearly appears in Figure 2. Preferably the springs move the barbs substantially all the way out, so that gravity need not be relied on.

Extension of the latches is limited by cooperating interengageable stops 34 which abut each other within the confines of the strut below the pivot 32, as shown. When the lower end of the strut enters an aperture between elements of the grillwork landing platform, the barbs will be forced together during passage of the strut downwardly and then will spring apart so as to engage under surfaces of grillwork elements. Because of the pivotal mounting of each pair of latches they may rock about the pivot 32 as a unit and thus automatically adjust themselves to tightly engage the under surface of the grillwork.

Figure 3:
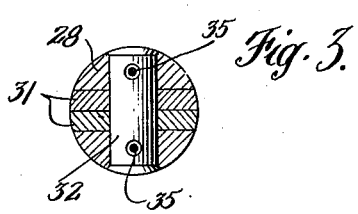
Figure 3 is a cross sectional view through the strut taken as indicated by the section line 3—3 on Figure 2.

It will be observed from Figure 2 that the degree of extension of the latches and the spacing of the elements 25 of the grillwork ensure that the strut cannot be withdrawn from the grillwork aperture until the latches are retracted. For the purpose of retracting the latches, flexible cables 35 are connected therewith and extended upwardly through the strut to an operating ring or other appropriate handle 36 which, as shown in Figure 1, is so located as to be readily accessible by the pilot. As seen in Figure 3, the cables 35 for the lower pair of barbs 31 may pass the barbs of the upper pairs at opposite sides thereof, suitable apertures being provided in the pivot pin 32 for this purpose.

Referring again to Figure 1, attention is now called to the fact that the lower member 28 of the strut may move vertically in the hollow upper member 29, a releasable latch 37 being employed to normally retain member 28 in an intermediate position. Spring 38 acts to maintain the latch 37 in engagement. After making a landing, when it is desired to move the aircraft around on the platform, an attendant on the platform may release latch 37, which will permit strut member 28 to drop and loosen the engagement of the latches, whereupon the pilot may then retract the latches 31 and draw strut member 28 upwardly by pulling on the operating member 36, thereby disengaging the strut from the aperture in the landing platform, so that the aircraft may be moved about as desired.

The upper end of strut member 29 is equipped with a spherical part 39 which is mounted in a spherical rubber cushion 40 which, in turn, is secured in casing 41. The casing is apertured at top and bottom to pass member 29, the apertures being round and considerably larger than member 29 so as to permit swinging self-adjustment of the strut in any direction, and especially in a fore and aft plane, so that upon making a landing, when the strut enters an aperture in the landing platform, some movement of the aircraft, forwardly, rearwardly, or sidewardly will be permitted through the capability of the strut to move to different angles because of the resilience of the rubber cushion 40.

Figure 4:
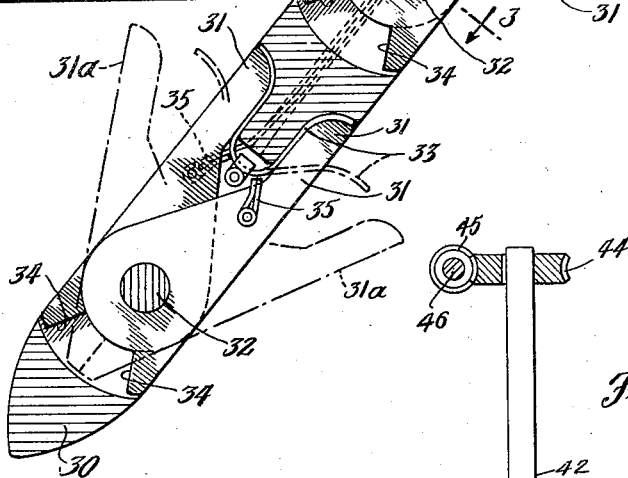
Figure 4 is a view taken generally in plan, particularly illustrating portions of the mechanism for mounting the strut in the aircraft and for retracting and projecting the strut.

As best seen in Figure 4, the mounting casing 41 for the strut is provided with trunnions 42 which are journaled in bearings 43 connected with fuselage framing, thereby providing a transverse swinging axis for the entire strut assembly, so that the strut may be retracted to the dotted line position 27a shown in Figure 1. Projection and retraction of the strut to and from the operative position is placed in the hands of the pilot, for which purpose a worm gear 44 is connected with one of the trunnion shafts 42, the gear cooperating with worm 45 mounted on shaft 46 which is connected, through bevel gearing 47, with an operating crank 48. The crank 48 is disposed for convenient access to the pilot.

With the mechanism described above, landings on small platforms on board ship may readily and safely be effected, for which purpose the pilot will, of course, operate the control crank or handle 48 to extend the strut to a position such as shown in Figure 1, and may then bring the machine down in a steep glide, or substantially vertically. As soon as the lower end of the strut enters an aperture in the grillwork landing platform, the latches 31 will spring out and thereby prevent the aircraft from being tossed about, notwithstanding pitching or rolling movement of the ship.

The provision of the retracting control enables the pilot not only to completely withdraw the strut during normal flight or when it is not desired to use the strut for landing, but also to adjust the angle of projection of the strut to meet varying wind and other landing conditions. Since the strut is equipped with several pairs of latches, at different elevations, the aircraft will effectively be held down to the landing platform notwithstanding differences in the adjusted position of the strut, and further notwithstanding differences in the loading of the aircraft which, of course, would cause the shock absorbers 21 to yield to a greater or lesser extent.

In the preferred arrangement, the latches will be located at such elevations that latch engagement with the grillwork will occur within the upper and lower limits of the normal shock absorption travel of the wheels.

The mechanism described may further be employed for take-off purposes under adverse conditions. Thus, with an aircraft equipped with means for effecting jump take-off, as above mentioned, after driving the rotor to a high speed with the blade pitch set at zero, the pilot may simultaneously disconnect the rotor drive clutch (10b) and increase the blade pitch, and at the same time retract the latches 31 on the strut. In this way the machine is held to the platform until the moment when take-off is desired.

Interlocked controls for disconnecting the rotor driving clutch and increasing the blade pitch may be employed in accordance with copending application of Agnew E. Larsen, Serial No. 363,593, filed October 31, 1940, which application issued July 20, 1943, as Patent No. 2,324,588. Thus, by way of illustration, a control valve 49 may be employed to deliver fluid under pressure from supply line 49a to the pipe 23a which extends to the blade pitch control cylinders 23, and also to additional piping 10c which is extended to a suitable actuating cylinder and piston device (not shown) for engaging the rotor drive clutch. Release of pressure from piping 23a and 10c may be effected by movement of the control valve 49 so as to connect the piping with the release line 49b, whereupon increase of blade pitch and disconnection of the rotor drive is brought about, in accordance with the aforementioned Ray patent and Larsen application. The supply and release lines 49a and 49b may be coupled with any suitable fluid pressure system such as that disclosed in said Larsen application 363,593, (now Patent No. 2,324,588).

Although, as above indicated, the latches 31 of the hold-down strut may be employed to retain the craft in proper position during driving of the rotor in preparation for take-off, an independent hold-down means is shown for this purpose in Figure 1, it being preferable to employ the independent means for reasons which will further appear.

Such independent means (see Figures 1 and 5) may comprise a cable 75 anchored to the platform 24 and having an eye 76 at its upper end adapted to be engaged by the releasable hook 77 which is pivotally mounted on bar 78 suspended by a jointed link 79 from a fixed part on the fuselage framing, as indicated at 80. A releasable catch 81, pivoted on bar 78, is adapted to engage the hook 77 and retain the same in closed position under the influence of a spring 82. Catch 81 may be pivoted upwardly to release the hook by a cable 83, the upper end of which is secured to stem 84 projecting from piston 85 which works in cylinder 86. The piston 85, and thus the catch 81, is normally urged to the upper position by a spring 87, and the piston may be moved to the lower end of the cylinder by admission of fluid pressure to the cylinder through connection 88 which, as shown in Figure 1, is coupled with piping 10c, to receive fluid under pressure therefrom when the control valve 49 is adjusted to engage the rotor drive clutch and reduce the blade pitch.

Thus, upon engagement of the rotor drive clutch to initiate rotation of the rotor in preparation for take-off, the catch 81 is retained in operative position by spring 82, thereby holding the hook in closed position so as to hold the aircraft tightly to the platform by the cable 75 until take-off is desired. Upon actuation of the control valve 49 to disconnect the rotor drive clutch and increase the blade pitch for take-off, the pressure released at the same time from cylinder 86 permits spring 87 to draw the catch 81 upwardly, thereby freeing hook 77 so that upon take-off the eye 76 may freely slide off the hook and not interfere with take-off.

The mechanisms provided in accordance with Figures 1 to 5 inclusive are adapted to meet widely varying landing and take-off condition. The safety of operation of an aircraft to and from a small landing platform on board ship is thereby greatly enhanced, particularly in view of the fact that both the landing and the take-off hold-down devices are arranged for automatic operation.

In the modification of Figure 6, it is contemplated that the strut be mounted in the same manner as that hereinbefore described, and further that the strut be equipped with the same type of retractable latches 31, with operating cables and ring 35 and 36, as before.

Here, however, the lower member 28a of the strut has a piston 50 at its upper end working in a cylinder 51 carried by the upper member 29a of the strut. A compression spring 52 normally urges the lower member 28a to its lower position. Pressure fluid is adapted to be admitted to the under side of piston 50 through port 53, which is coupled by means of piping 54 and one or more flexible tubes 55 with a valve casing 56. Branches 54a and 54b connect piping 54 with angularly spaced valve ports 57 and 58 arranged to be connected with ports 59 and 60, respectively, by means of transverse port 61 in a rotatable valve 62. Fluid under pressure is delivered to port 59 through connection 63 from pump 64, which latter derives fluid from reservoir 65 through pipe 66. A return or relief line 67 couples port 60 with the reservoir. The valve 62 is actuable by an arm 68 which is adapted to be connected through link 69 with a shaft 70 or some other part which partakes of the vertical shock absorption movement of landing wheel 19.

When the aircraft is in flight, the parts occupy the positions shown in full lines in Figure 6, at which time pressure from cylinder 51 is exhausted through piping 54, branch 54b, valve passage 61, and pipe 67 to the fluid reservoir. Upon making a landing, the upward shock absorption movement of wheel 19 moves valve 62 so as to couple branch 54a with the pressure line 63, thereby delivering fluid through piping 54 to the bottom of cylinder 51 which, in turn, forces strut member 28a upwardly, thus serving to place the strut under tension to hold the aircraft tightly to the landing platform. It will be understood that the length of the strut, or its projection thereof downwardly from the body of the aircraft, is such that the latches 31 will engage grillwork elements of the landing platform prior to appreciable upward shock absorption movement of the landing wheels 19, thereby ensuring engagement of the latches before the fluid pressure system serves to contract the strut.

It is contemplated that a readily removable pin 71 be employed for the connection between link 69 and valve operating arm 68, so that after a landing has been made, an attendant may readily withdraw the pin and then manually move the valve operating arm 68 to release the pressure from cylinder 51, after which the lower strut member 28a may be withdrawn, and the aircraft moved about, as desired.

Preferably, although not essentially, the arrangement of Figure 6 further includes a spring pressed releasable latch 72 adapted to engage ratchet teeth 73 formed at one side of the upper extension 28b of the strut member 28a. This device will serve to retain the barbs 31 in engagement with the landing platform even after exhaust of fluid pressure from the lower end of cylinder 51.

In the modification shown in Figures 7, 8 and 9, provision is made for automatic release of the barbs on the hold-down strut when the controls are actuated to effect direct take-off. Thus, in this form, a single hold-down means may be employed not only for landing, but also for take-off.

In Figure 7, the upper end of the hold-down strut appears at 29, the barbs (not shown in this view) being retractable by upward movement of element 36, as in Figure 1. Said movement may be effected by means of a lever 89 pivoted at 90 to a bracket 91 which is mounted to move with the hold-down strut. The free end of lever 89 is pinned at 92 to a cylinder 93, and piston 94 working in the cylinder has a stem 95 which projects for connection at 96 with a part of bracket 91. Admission of pressure fluid to the upper end of cylinder 93 through piping 97 (which may incorporate flexible tubing) causes lever 89 to move upwardly and thus retract the barbs at the lower end of the strut.

Piping 97 is associated with a control system including a control valve 98, which serves also for engagement and disengagement of the rotor clutch and for adjustment of the blade pitch. In a manner similar to the control system of Figure 1, pressure may be brought to valve 98 through connection 49a, and the branched pipe 49b may serve for pressure release. Branches 10c and 23a of pipe 99 extend, respectively, to the rotor drive clutch and the blade pitch control cylinders 23. As clearly appears from the showing of the valve in Figure 7, in one position of adjustment, the valve member 100 serves to couple the pressure supply line 49a with pipes 10c and 23a so as to engage the rotor clutch and reduce the blade pitch, for drive of the rotor in preparation for take-off. At the same time, valve member 100 interconnects piping 97 with one branch of the release line 49b, so that the pressure is exhausted from cylinder 93 and the barbs 31 of the hold-down strut may remain extended and in engagement with the landing platform.

When the valve 100 is moved to the position shown in Figure 8, pressure is released from pipes 10c and 23a through pipe 99 and to the relief line 49b, thereby disengaging the rotor drive clutch and permitting the blade pitch to increase for take-off. In this adjustment, moreover, the pressure supply line 49a is coupled with piping 97 extended to cylinder 93, so that fluid pressure is admitted to cylinder 93 to move the barb control element 36 upwardly and thus retract the barbs to permit take-off.

Valve 100 is capable of another adjustment, as shown in Figure 9, in which the pressure supply line 49a is blocked and all of pipes 10c, 23a and 97 are connected with the release line 49b. With this setting, the barbs are permitted to be extended, the rotor clutch is disconnected, and the blade pitch is retained at the normal flight setting, so that the hold-down strut is conditioned for cooperation with the platform in making a landing.

A very important advantage of the present invention is that the required accuracy of spotting in making a landing is minimized, since the hold-down device will be effective at any point over the area of the landing platform.

I claim:

1. In an aircraft capable of substantially vertical descent to a landing and having landing elements supported from the craft with freedom for shock absorption movement in a generally vertical direction, a device carried by the aircraft for holding the aircraft down upon making a landing, said device comprising a strut extending downwardly from the aircraft to project into an aperture of a grillwork landing platform and incorporating relatively movable parts to provide for extension and contraction of the strut, a lower part of said strut having means for engagement with a grillwork element, and means automatically operative upon making a landing to contract said strut, thus drawing the aircraft tightly to the landing platform.

2. A construction in accordance with claim 1 in which said last means is associated with a landing element of the aircraft and is operated under the influence of shock absorption movement of said element.

3. A construction in accordance with claim 1 and further including releasable latch means operative to prevent extension of said strut until release thereof.

4. In an aircraft capable of substantially vertical descent to a landing and having landing elements supported from the craft with freedom for shock absorption movement in a generally vertical direction, a device carried by the aircraft for holding the aircraft down upon making a landing, said device including a member adapted to project through an aperture of a grillwork landing platform and having a retractable latch or barb adapted to engage an under surface of a grillwork element, the parts being so relatively disposed that said latch will descend sufficiently to engage a grillwork element at least within the limits of said shock absorption movement of the landing elements of the aircraft.

5. A construction in accordance with claim 4 and further including means automatically operative upon making a landing to draw said member with the latch carried thereby toward the aircraft, thus tightening the latch against the grillwork element engaged thereby.

6. In an aircraft capable of substantially vertical descent to a landing and having landing elements supported from the craft with freedom for shock absorption movement in a generally vertical direction, a device carried by the aircraft for holding the aircraft down upon making a landing, said device comprising a strut extending downwardly from the aircraft to project into an aperture of a grillwork landing platform, and a plurality of vertically spaced retractable barbs carried by said strut adapted to engage grillwork of the landing platform.

7. In combination with an aircraft capable of substantially vertical ascent and descent, and with a landing platform, mechanism associated with said platform and said aircraft comprising complementary releasable interlocking hold-down elements adapted to interengage and hold the craft to the platform in any one of a plurality of different positions on the platform, means placing said elements under approximately vertical tension when interengaged, and pilot operated means for releasing the hold-down elements when it is desired to effect substantially vertical take-off.

8. In combination with a retaining grillwork, and an aircraft having a sustaining rotor providing for generally vertical landing and take-off, a device carried by the aircraft for holding the aircraft down upon making a landing, said device comprising a member adapted to project into a grillwork aperture and having means automatically engaging a grillwork element when the landing is effected, additional hold-down means for the aircraft operative to permit ready release of said device after landing and comprising a releasable tie, and means operable by the pilot for releasing said tie when it is desired to effect generally vertical take-off.

9. A construction in accordance with claim 8 in which the aircraft further incorporates a primary control for effecting vertical take-off, and mechanism interrelating the operation of the releasable tie and said primary control and providing for release of the tie upon actuation of the control to effect take-off.

10. In an aircraft capable of substantially vertical descent to a landing and having landing elements supported from the craft with freedom for shock absorption movement in a generally vertical direction, a device carried by the aircraft for holding the aircraft down upon making a landing, said device comprising a strut extending downwardly from the aircraft to project into an aperture of a grillwork landing platform and incorporating relatively movable parts to provide for extension and contraction of the strut, a lower part of said strut having means for engagement with a grillwork element, and releasable means for normally retaining said relatively movable parts of the strut in a predetermined position intermediate the limits of movement, to provide for disengagement of the strut from the grillwork platform after a landing had been made.

11. In aircraft hold-down equipment, a downwardly-projecting hold-down device on the aircraft and retaining grid adapted for cooperation with the hold-down device on said downwardly-projecting aircraft, comprising grid elements which in cross-section taper to present a narrowed upper edge so as to facilitate guiding of the hold-down device into the spaces between grid elements.

12. A construction according to claim 11 wherein the grid elements are of extended vertical depth so as to have greater inherent stiffness than a wire-type grid.

13. In an aircraft capable of substantially vertical descent to a landing platform and having landing elements, a device carried by the aircraft for holding the aircraft down upon making a landing, said device comprising a member extending downwardly from the aircraft and connected therewith so as to move downwardly with the aircraft during descent to a landing, the said landing elements being supported on the craft with freedom for shock absorption movement in a generally vertical direction with respect to said member, and said member being adapted to project into an aperture of a grillwork and having means automatically engaging the under side of such grillwork in position to place the member under direct vertical tension within the range of shock absorption movement of the landing elements upon completion of a landing, thus holding the aircraft tightly to the landing platform.

14. For use with an aircraft having a compressible landing-gear, an aircraft hold-down device having complementary automatically interlocking elements associated respectively with the craft and with an aircraft supporting base, the interlocking element associated with the aircraft being connected with the aircraft independently of the compressible landing gear so as to move downwardly with the aircraft during descent to a landing and thereby provide for holding the landing gear under a compression greater than the dead weight of the craft by reaction between said craft and said supporting base.

HAROLD F. PITCAIRN.